(12) United States Patent
Chu et al.

(10) Patent No.: US 6,683,858 B1
(45) Date of Patent: Jan. 27, 2004

(54) HYBRID SERVER ARCHITECTURE FOR MIXING AND NON-MIXING CLIENT CONFERENCING

(75) Inventors: Frank J. Chu, Cupertino, CA (US); Virgil Patrick Dobjanschi, Fremont, CA (US); Corey Gates, Belmont, CA (US); Katherine W. Kwan, San Jose, CA (US); Daniel W. Wright, San Jose, CA (US)

(73) Assignee: Paltalk Holdings, Inc., New York, NY (US)

( * ) Notice: Subject to any disclaimer, the term of this patent is extended or adjusted under 35 U.S.C. 154(b) by 758 days.

(21) Appl. No.: 09/604,961

(22) Filed: Jun. 28, 2000

(51) Int. Cl.[7] ................................................ H04L 12/16
(52) U.S. Cl. .................................... 370/263; 379/202.01
(58) Field of Search ................................. 370/260, 261, 370/262, 263, 265, 266, 352–356; 379/158, 202.01

(56) References Cited

U.S. PATENT DOCUMENTS 5,914,940 A * 6/1999 Fukuoka et al. ............ 370/263
6,418,125 B1 * 7/2002 Oran ........................... 370/266

* cited by examiner

Primary Examiner—Ajit Patel
Assistant Examiner—Brenda Pham
(74) Attorney, Agent, or Firm—Skadden, Arps, Slate, Meagher & Flom LLP

(57) ABSTRACT

A system, method and computer program product which allows both mixing (e.g., PC-based) and non-mixing (e.g., phone-based) clients to participate in a single audio conference. The system includes a hybrid multi-point control unit (i.e., conferencing server) that performs mixing for phone-based clients and multiplexing for PC-based clients. The method and computer program product determines which clients have the capability to mix multiple audio streams and which do not. For those clients capable of mixing, the server multiplexes the packets of audio data received from each client on the active speakers list into a multiplexed stream. For those clients that are not capable of mixing, the server mixes the packets of audio data received from each client on the active speakers list into one combined packet.

13 Claims, 4 Drawing Sheets

HYBRID SERVER ARCHITECTURE FOR MIXING AND NON-MIXING CLIENT CONFERENCING

BACKGROUND OF THE INVENTION

1. Field of the Invention

The present invention relates generally to computer-based telephony networks and more particularly to servers that manage telephony conferencing.

2. Related Art

In today's technological environment, there exists many ways for several people who are in multiple geographic locations to communicate with one another simultaneously. One such way is audio conferencing. Audio conferencing applications serve both the needs of business users (e.g., national sales force meeting) and leisure users (e.g., audio chat room participants) who are geographically distributed.

Traditional audio conferencing involved a central conferencing server which hosted an audio conference. Participants would use their telephones and dial in to the conferencing server over the Public Service Telephone Network (PSTN) (also called the Plain Old Telephone System (POTS)).

The availability of low-cost personal computers, networking equipment, telecommunications, and related technology, however, has dramatically changed the way people communicate. One example of such change is the explosion of people connected to the global (sometimes referred to as the "public") Internet.

The connectivity achieved by the Internet—connecting numerous, different types of networks—is based upon a common protocol suite utilized by those computers connecting to it. Part of the common protocol suite is the Internet Protocol (IP), defined in Internet Standard (STD) 5, Request for Comments (RFC) 791 (Internet Architecture Board). IP is a network-level, packet (i.e., a unit of transmitted data) switching protocol.

In recent years, the possibility of transmitting voice (i.e., audio) over the worldwide public Internet has been recognized. Voice over IP (VoIP) began with computer scientists experimenting with exchanging voice using personal computers (PCs) equipped with microphones, speakers, and sound cards.

VoIP further developed when, in March of 1996, the International Telecommunications Union-Telecommunications sector (ITU-T), a United Nations organization, adopted the H.323 Internet Telephony Standard. Among its specifications, H.323 specifies the minimum standards (e.g., call setup and control) that equipment must meet in order to send voice over the IP, and other packet-switched network protocols where quality of sound cannot be guaranteed. Thus, conferencing servers (also called multipoint control units (MCUs)) were developed to host audio conferences where participants connected to a central MCU using PC-based equipment and the Internet, rather than traditional phone equipment over the PSTN.

More recently, several alternatives to H.323 have been developed. One such alternative is the Session Initiation Protocol (SIP) developed within the Internet Engineering Task Force (IETF) Multiparty Multimedia Session Control (MMUSIC) Working Group. SIP, which is well-known in the relevant art(s), is a signaling protocol for Internet conferencing and telephony. SIP addresses users using an e-mail-like address and utilizes a portion of the infrastructure used for Internet e-mail delivery. SIP is more powerful than H.323 in providing call control and extended feature sets. It handles basic setup functions as well as enhanced services (e.g., call forwarding).

Given the rapid pace of development in the telephony industry—both in protocols and equipment—and the existence of legacy equipment and protocols (e.g., telephones and switching networks such as the PSTN), it is desirable for conferencing servers (or MCUs) to provide support for users of both new (i.e., packet-based) and legacy (i.e., switching-based) systems. Therefore, what is needed is a hybrid server architecture for mixing and non-mixing client conferencing. The hybrid server should realize the capabilities of the various participants' equipment (e.g., PC-based client versus phone-based clients) and provide the appropriate audio data to each participant.

SUMMARY OF THE INVENTION

The present invention is directed to a hybrid server architecture, that meets the above-identified needs, whereby mixing (e.g., PC-based clients) and non-mixing (e.g., phone) clients can simultaneously participate in a single audio conference application.

The system of the present invention includes a receiver capable of receiving audio packets from each client, means for determining and keeping a list of clients who are currently active speakers, and means for storing information (e.g., database, list, linked list, table, flag, or the like) indicative of whether each client has the capability to mix multiple audio streams.

The system also includes a multiplexor capable of multiplexing the packets of audio data received from each client on the list of active speakers into a multiplexed stream, and a mixer capable of mixing the packets of audio data received from each client on the list of active speakers into one combined packet.

The system further includes means for sending the multiplexed stream to each of the clients which have the capability to mix multiple audio streams, and the combined packet to each of the plurality of clients which do not have the capability to mix multiple audio streams.

The method and computer program product of the present invention include the steps of receiving audio packets from each client, determining which are active speakers and forming an active speakers list. Then, the clients are divided into two categories—those which have the capability to mix multiple audio streams and those which do not. For those clients which can mix, the server multiplexes the packets of audio data received from each client on the active speakers list into a multiplexed stream. For those clients which cannot mix, the server mixes the packets of audio data received from each client on the active speakers list into one combined packet.

The method and computer program product of the present invention then send the multiplexed stream to each of the clients that can mix, and send the combined packet to each of the clients that cannot mix. The method and computer program product of the present invention also perform an "echo suppression" during the sending of either the multiplexed stream or combined packet so that each client, if they are an active speaker, will not hear themselves speaking.

An advantage of the present invention is that a single server or multipoint control unit (MCU) can provide conferencing services to multiple clients that are using varying equipment and protocols.

Another advantage of the present invention is that servers or MCUs, by realizing the audio mixing capabilities of their clients, can distribute the computational burden of mixing audio streams of the active speakers.

Another advantage of the present invention is that by providing multiplexed packets to clients who are capable of mixing, better sound quality is achieved by reducing the effect of "transcoding artifacts."

Yet another advantage of the present invention is that by providing multiplexed packets to clients who are capable of mixing, servers or MCUs can be scaled to support more simultaneous conferences due to the efficiency gained by not having to mix for every client.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

I. System Architecture Overview

This present invention is directed to a hybrid server architecture for mixing (e.g., mixing capable PC clients connected via Internet Protocol (IP)) and non-mixing (e.g., phone) client conferencing. In a preferred embodiment of the present invention, a service provider supplies the infrastructure (i.e., a hybrid conferencing server or multi-point control unit (MCU)), agreement terms, and facilities so that clients (i.e., participants) who subscribe to their conferencing services can take part in a multi-party audio conference application. The service provider would also provide customer service, support, and billing as will be apparent to one skilled in the relevant art(s) after reading the description herein. The clients would connect to the hybrid server using whatever equipment and protocol they currently have access to.

Figure 1:
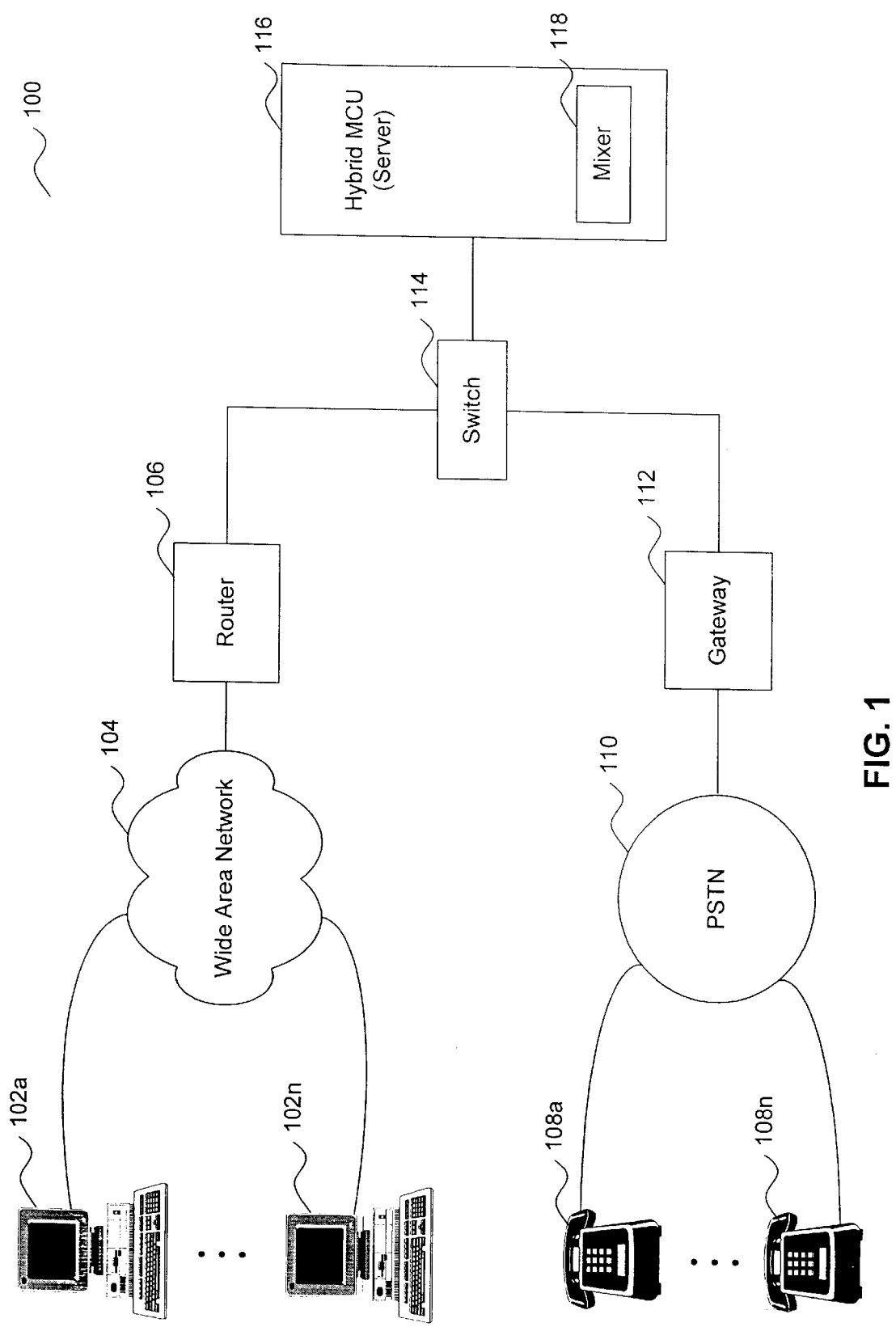
FIG. 1 is a block diagram illustrating the overall system architecture of an embodiment of the present invention, showing connectivity among the various components.

Referring to FIG. 1, a block diagram illustrating the system architecture of an embodiment of the present invention, showing connectivity among the various components, is shown. More specifically, FIG. 1 illustrates a hybrid network architecture 100 for IP-based client and phone client conferencing. Architecture 100 includes a plurality of PC-based clients 102 (shown as clients 102a–102n) which connect to a wide area network (e.g., the public Internet) 104. The wide area network 104 is connected to the service provider's facilities through a router 106 and a switch 114 which is capable of routing IP packets.

Architecture 100 also includes a plurality of telephone-based clients 108 (shown as clients 108a–108n) which connect to the PSTN 110 (i.e., circuit-switched network). The PSTN 110 is connected to the service provider's facilities (i.e., server 116) through a gateway 112 and the switch 114.

Connected to the switch 114, is the service provider's server or multipoint control unit (MCU) 116, which includes a mixer 118. The switch 114 enables the service provider's MCU 116 to receive audio packets from both PC-based clients 102 using, for example, the SIP protocol, as well as receive H.323 protocol packets from the telephone-based clients 108 who connect via gateway 112.

The present invention is described in terms of the above example. This is for convenience only and is not intended to limit the application of the present invention. In fact, after reading the following description, it will be apparent to one skilled in the relevant art(s) how to implement the following invention in alternative embodiments (e.g., server 116 handling protocols and equipment other than those illustrated herein). Further, while FIG. 1 illustrates mixer 118 as part of MCU 116, those skilled in the relevant art(s) will appreciate that mixer 118 can, in an alternate embodiment, be separated from, and coupled to, MCU 116.

The terms "client," "subscriber," "party," "participant," and the plural form of these terms may be used interchangeably throughout herein to refer to those who would access, use, and/or benefit from the hybrid server of the present invention.

II. Mixer Architecture

Figure 2:
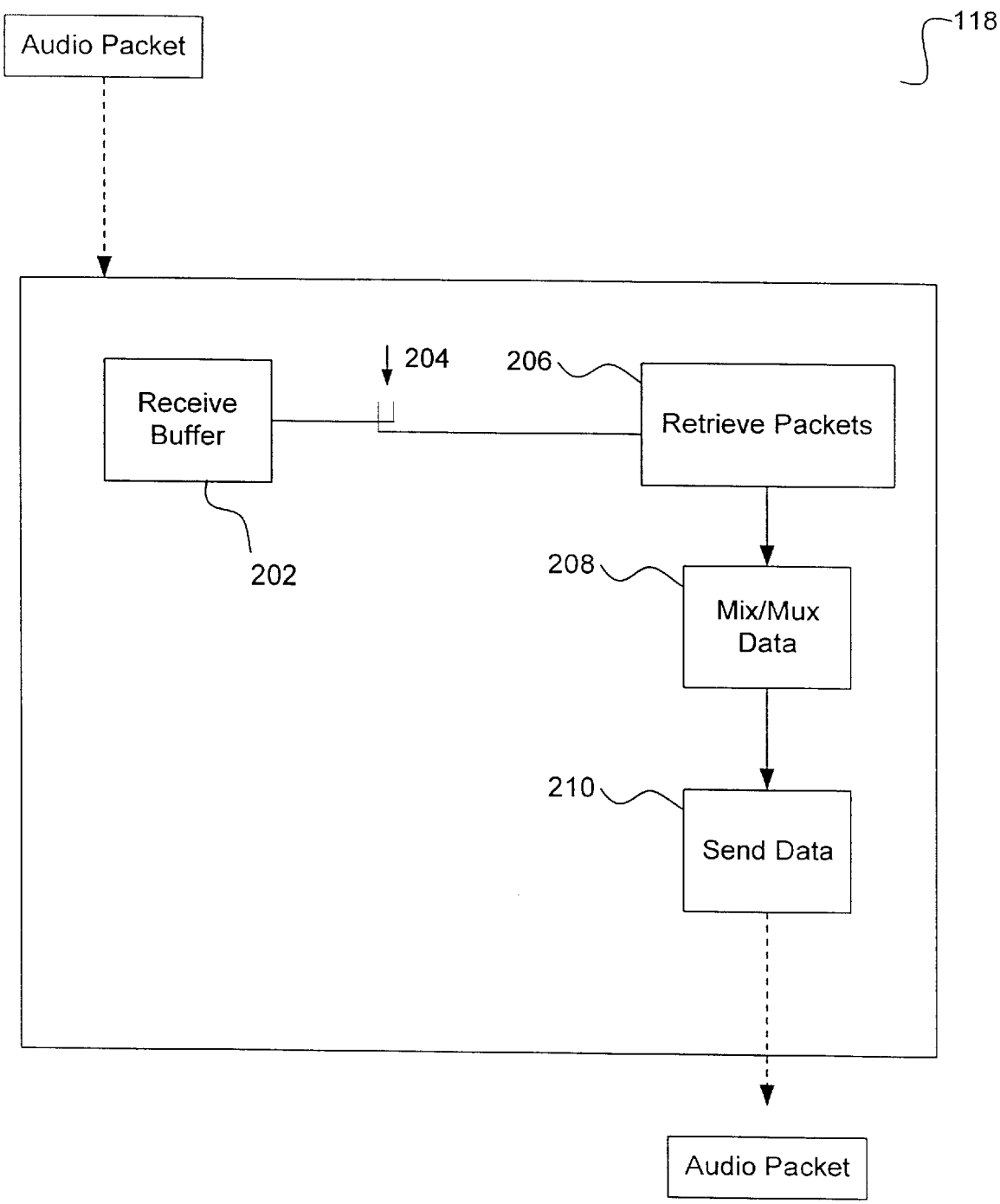
FIG. 2 is a block diagram illustrating the system architecture of a hybrid mixer according to an embodiment of the present invention.

Referring to FIG. 2, a block diagram illustrating the system architecture of a hybrid mixer 118 according to an embodiment of the present invention is shown. More specifically, the architecture of mixer 118 which allows the service provider to supply a hybrid network architecture 100 for IP-based client and phone client conferencing is now described in more detail.

Mixer 118 includes buffers 202 which receive audio packets from the clients 102 and 108 via switch 114. (See FIG. 1.) Mixer 118 also includes a packet retriever 206 which is coupled to buffers 202. The connection between buffers 202 and packet retriever 206, however, is only complete when a switch 204 is closed. Switch 204 is an event driven switch which can be timer driven. An event can be generated on a pre-determined time schedule (e.g., every 0.5 to 1.0 second). In an alternative embodiment, events may be buffer size driven. That is, an event may be generated every time buffers 202 receive a pre-determined number of audio data packets (e.g., 90 milliseconds of audio data for each speaker).

Mixer 118 also includes a packet mixer/multiplexor ("mix/mux") 208. The mix/mux 208 forms multiplexed audio packets to be sent to clients capable of mixing multiple audio streams (e.g., clients 102) and also forms mixed audio streams to be sent to non-mixing clients (e.g., clients 108 which have no capability to mix multiple audio streams). Mixer 118 also includes a packet sender 210 which forwards the packets created by mix/mux 208 to clients 102 and 108.

III. System Operation

Figure 3:
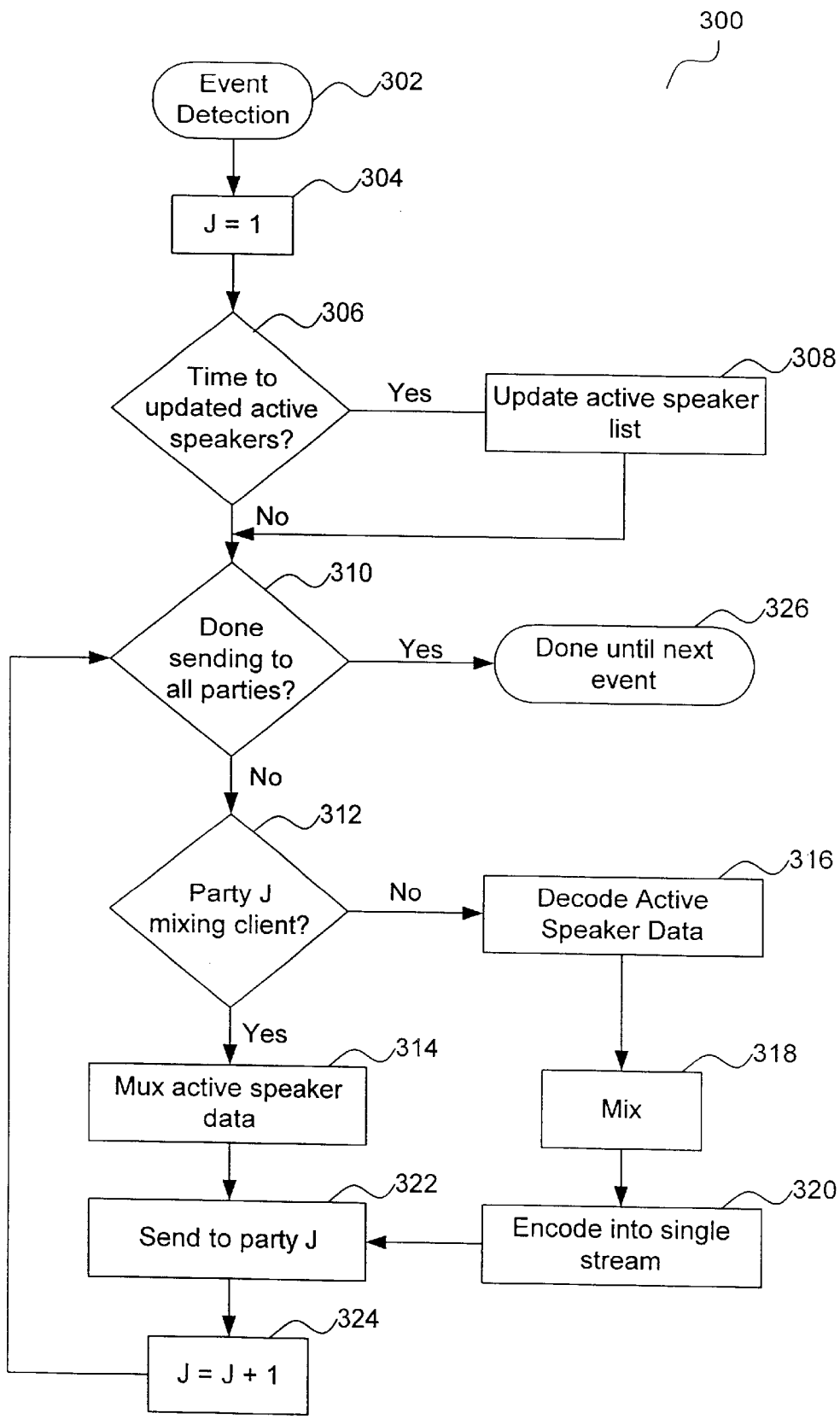
FIG. 3 is a flowchart representing the general operational flow according to an embodiment of the present invention.

Referring to FIG. 3, a flowchart representing the general operational flow, according to an embodiment of the present invention, is shown. More specifically, FIG. 3 depicts an example control flow 300 involved in providing a hybrid IP-based client and phone client audio conference. Control flow 300 begins at step 302. In step 302, an event is detected by the mixer 118 causing switch 204 to close. As mentioned above, such an event can be timer driven, where an event is generated on a pre-determined time schedule. In an alternative embodiment, events may be buffer size driven. That is, an event may be generated every time buffers 202 receive a pre-determined number of audio data packets from each speaker.

Upon detecting an event, control flow 300 proceeds to step 304. In step 304, a counter j is set to one. (Assume there are N clients currently participating in an audio conference application.) In step 306, control flow 300 determines whether the active speaker list needs to be updated. In an embodiment, the active speaker list is updated on a pre-determined time schedule which is independent of the event time schedule in step 302.

If the determination of step 306 is true, the list of active speakers is updated in step 308. The list of active speakers may be updated, in one embodiment, by comparing the average energy values of each participant's audio data. As will be apparent to one skilled in the relevant art(s), if a conference has N participants, the sever will only allow a certain number of speakers k to be considered "active" (i.e., those participants who are actually speaking rather than simply listening). (Where, for example, k=3<<N.) This is because if the number of active speakers is too large, the data being sent by the server to every participant in the audio conference will be unintelligible (i.e., too many participants speaking on top of each other).

In step 310, control flow 300 determines whether all the parties have been sent an updated audio stream during the current event detected in step 302. That is, the determination of step 310 is whether j is equal to N. If not, in step 312, control flow 300 determines whether party j is a mixing client. Whether a particular party is a mixing client (e.g., a PC-based client 102 using SIP) or not (e.g., a telephone client 108 using H.323) is static state information which, in one embodiment, may be stored on the MCU 116 upon each client's connection to the audio conference. Such information storage can be in the form of a database, internal memory such as a list, linked list, table, or flag or the like.

Further, the determination of each client's mixing capability can be facilitated, in one embodiment, by the service provider inserting proprietary code into the audio stream or control stream received from its subscribers (i.e., clients 102 or 108). In an alternate embodiment, such mixing capability information may already be present in the audio stream received from subscribers as newer telephony protocols are developed by the IETF and the like.

In step 314, control flow 300 multiplexes (by employing mix/mux 208) the audio stream data (stored on retriever 206) for all k active speakers. In step 314, active speaker audio data for each and every active speaker is multiplexed. However, as will be apparent to those skilled in the relevant art(s), if party j is an active speaker, step 314 will not include party j's own audio data in the multiplexed packets. This is, in essence, an echo suppression function so that party j will not "hear themselves speak."

If step 312 determines that party j is non-mixing client, then step 316 decodes all the active speaker audio data into raw uncompressed data. As in step 314, step 316 will decode all active speaker audio data for each and every active speaker. However, as will be apparent to those skilled in the relevant art(s), if party j is an active speaker, step 316 will not include party j's own audio data in the decoded data. This is, in essence, an echo suppression function so that party j will not "hear themselves speak." Then, the active speaker data is mixed in step 318 and encoded into a single stream in step 320. For example, if there are two (i.e., k=2) active speakers, step 320 will encode two 90 ms raw frames of data and encode them into a single 90 ms frame of data.

Then, in step 322, control flow 300 either sends the multiplexed audio packet (created in step 314) to a mixing client or a mixed audio stream (created in step 320) to a non-mixing client. In step 324, the counter j is incremented so that the next client can receive updated audio data during the current event detected in step 302. As will be appreciated by one skilled in the relevant art(s) and indicated by step 326, steps 310–324 loop until all participants (i.e., j=N) have been sent an updated audio stream during the current event detected in step 302. Thus, control flow 300 would continue until the server ceases to host the audio conference (i.e., the conference is over and terminated).

IV. Environment

The present invention (i.e., architecture 100, control flow 300, or any part thereof) may be implemented using hardware, software or a combination thereof and may be implemented in one or more computer systems or other processing systems. In fact, in one embodiment, the invention is directed toward one or more computer systems capable of carrying out the functionality described herein.

Figure 4:
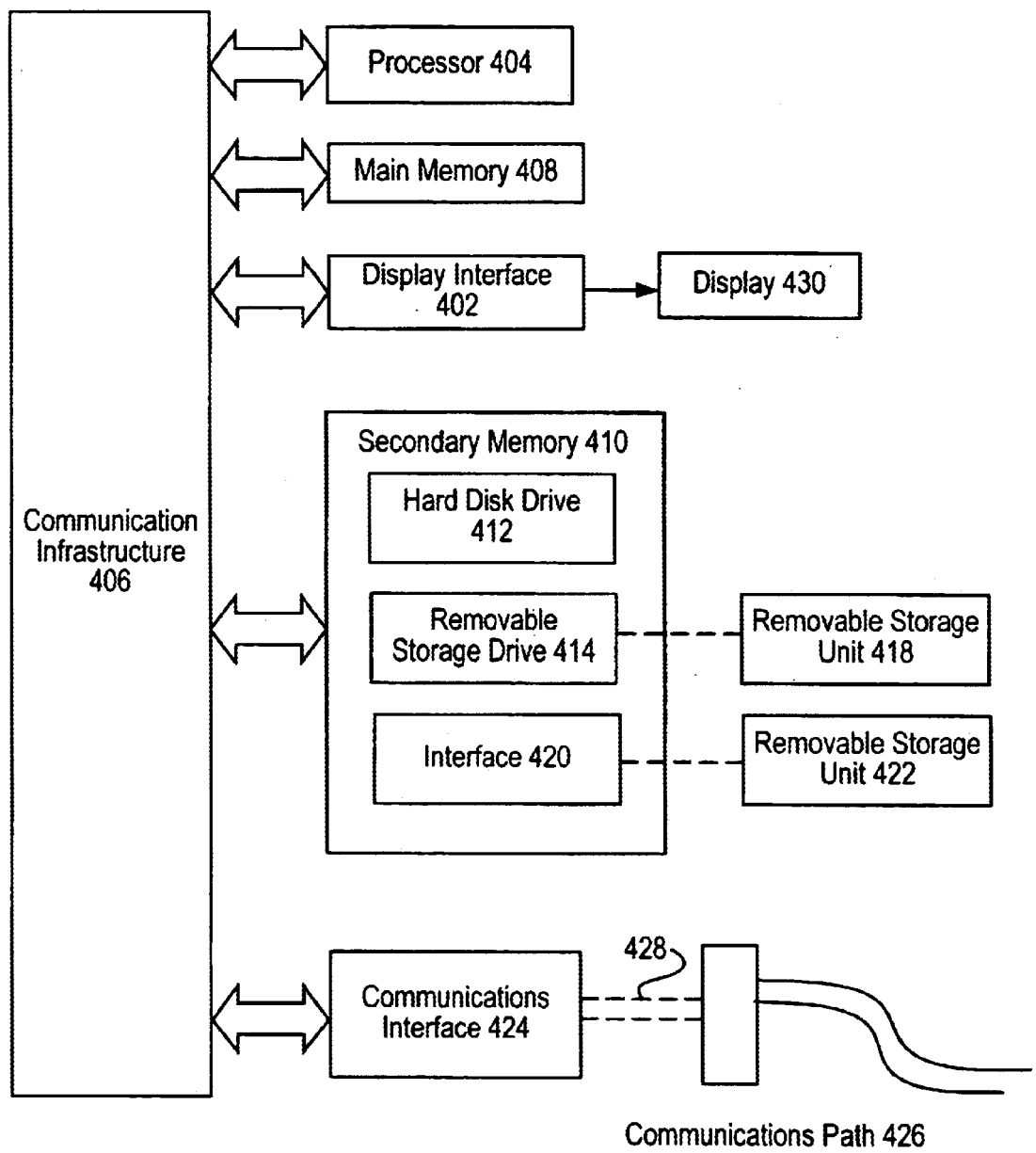
FIG. 4 is a block diagram of an example computer system for impementing the present invention.

An example of a computer system 400 is shown in FIG. 4. The computer system 400 represents any single or multi-processor computer. The computer system 400 includes one or more processors, such as processor 404. The processor 404 is connected to a communication infrastructure 406 (e.g., a communications bus, cross-over bar, or network). Various software embodiments are described in terms of this exemplary computer system. After reading this description, it will become apparent to a person skilled in the relevant art how to implement the invention using other computer systems and/or computer architectures.

Computer system 400 can include a display interface 405 that forwards graphics, text, and other data from the communication infrastructure 402 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar means for allowing computer programs or other instructions to be loaded into computer system 400. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a PCM-CIA slot and card, etc. Software and data transferred via communications interface 424 are in the form of signals 428 which may be electronic, electromagnetic, optical or other signals capable of being received by communications interface 424. These signals 428 are provided to communications interface 424 via a communications path (i.e., channel) 426. This channel 426 carries signals 428 and may be implemented using wire or cable, fiber optics, a phone line, a cellular phone link, an RF link and other communications channels.

In this document, the terms "computer program medium" and "computer usable medium" are used to generally refer to media such as removable storage drive 414, a hard disk installed in hard disk drive 412, and signals 428. These computer program products are means for providing software to computer system 400. The invention is directed to such computer program products.

Computer programs (also called computer control logic) are stored in main memory 408 and/or secondary memory 410. Computer programs may also be received via communications interface 424. Such computer programs, when executed, enable the computer system 400 to perform the features of the present invention as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. For example, the operational flow presented in FIG. 3, is for example purposes only and the present invention is sufficiently flexible and configurable such that it may flow in ways other than that shown.

Further, it will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method of providing audio conferencing for a plurality of clients using varying equipment and protocols, comprising the steps of:
    (1) receiving an audio packet from each of the plurality of clients;
    (2) determining which of the plurality of clients is an active speaker and forming an active speakers list;
    (3) determining that a first subset of the plurality of clients has the capability to mix multiple audio streams;
    (4) determining that a second subset of the plurality of clients does not have the capability to mix multiple audio streams;
    (5) multiplexing said packets of audio data received from each client on said active speakers list into a multiplexed stream;
    (6) sending said multiplexed stream to each of said first subset of the plurality of clients;
    (7) mixing said packets of audio data received from each client on said active speakers list into one combined packet; and
    (8) sending said combined packet to each of said second subset of the plurality of clients;
    whereby said plurality of clients can simultaneously participate in a single audio conference application.

2. The method of claim 1, further comprising the step of:
    before sending said multiplexed stream to one of said first subset of the plurality of clients, removing from said multiplexed stream said packets of audio data received from said one of said first subset of the plurality of clients when said one of said first subset of the plurality of clients is on said active speakers list.

3. The method of claim 1, further comprising the step of:
    before sending said combined packet to one of said second subset of the plurality of clients, removing from said combined packet said packets of audio data received from said one of said second subset of the plurality of clients when said one of said second subset of the plurality of clients is on said active speakers list.

4. The method of claim 1, wherein at least one of said first subset of the plurality of clients is using PC-based equipment and the Session Initiation Protocol (SIP).

5. The method of claim 1, wherein at least one of said second subset of the plurality of clients is using a telephone and the H.323 protocol.

6. A system for providing audio conferencing for a plurality of clients, comprising:
    a receiver capable of receiving an audio packet from each of the plurality of clients;
    means for maintaining a list of each of the plurality of clients that is an active speaker;
    means for storing information indicative of whether each of the plurality of clients has the capability to mix multiple audio streams;
    a multiplexor capable of multiplexing said packets of audio data received from each client on said list of active speakers into a multiplexed stream;
    a mixer capable of mixing said packets of audio data received from each client on said list of active speakers into one combined packet; and
    a packet sender capable of sending, based on information in said means for storing, said multiplexed stream to each of the plurality of clients which have the capability to mix multiple audio streams, and capable of sending said combined packet to each of the plurality of clients which do not have the capability to mix multiple audio streams;
    whereby the plurality of clients can simultaneously participate in a single audio conference application.

7. The system of claim 6, further comprising:
    means for removing, before said packet sender sends said multiplexed stream to one of the plurality of clients which have the capability to mix multiple audio streams, from said multiplexed stream said packets of audio data received from said one of the plurality of clients, when said one of the plurality of clients is on said list of active speakers.

8. The system of claim 6, further comprising:

means for removing, before said packet sender sends said combined packet to one of the plurality of clients which do not have the capability to mix multiple audio streams, from said combined packet said packets of audio data received from said one of the plurality of clients, when said one of the plurality of clients is on said list of active speakers.

9. The system of claim 6, wherein at least one of the plurality of clients, which has the capability to mix multiple audio streams, is using PC-based equipment and the Session Initiation Protocol (SIP).

10. The system of claim 6, wherein at least one of the plurality of clients, which does not have the capability to mix multiple audio streams, is using a telephone and the H.323 protocol.

11. A computer program product comprising a computer usable medium having control logic stored therein for causing a computer to provide audio conferencing for a plurality of clients using varying equipment and protocols, said control logic comprising:

first computer readable program code means for causing the computer to receive an audio packet from each of the plurality of clients;

second computer readable program code means for causing the computer to determine which of the plurality of clients is an active speaker and forming an active speakers list;

third computer readable program code means for causing the computer to determine that a first subset of the plurality of clients has the capability to mix multiple audio streams;

fourth computer readable program code means for causing the computer to determine that a second subset of the plurality of clients does not have the capability to mix multiple audio streams;

fifth computer readable program code means for causing the computer to multiplex said packets of audio data received from each client on said active speakers list into a multiplexed stream;

sixth computer readable program code means for causing the computer to send said multiplexed stream to each of said first subset of the plurality of clients;

seventh computer readable program code means for causing the computer to mix said packets of audio data received from each client on said active speakers list into one combined packet; and eighth computer readable program code means for causing the computer to send said combined packet to each of said second subset of the plurality of clients;

whereby the plurality of clients can simultaneously participate in a single audio conference application.

12. The computer program product of claim 11, further comprising:

ninth computer readable program code means for causing the computer, before sending said multiplexed stream to one of said first subset of the plurality of clients, to remove from said multiplexed stream said packets of audio data received from said one of said first subset of the plurality of clients when said one of said first subset of the plurality of clients is on said active speakers list.

13. The computer program product of claim 11, further comprising:

ninth computer readable program code means for causing the computer, before sending said combined packet to one of said second subset of the plurality of clients, to remove from said combined packet said packets of audio data received from said one of said second subset of the plurality of clients when said one of said second subset of the plurality of clients is on said active speakers list.

\* \* \* \* \*